United States Patent [19]

Slavin et al.

[11] Patent Number: 4,561,631

[45] Date of Patent: Dec. 31, 1985

[54] TURBO BOOST VALVE

[75] Inventors: Michael Slavin; Charles R. Martus, both of Troy; Ellsworth S. Miller, Mt. Clemens, all of Mich.

[73] Assignee: Lectron Products, Inc., Rochester, Mich.

[21] Appl. No.: 618,722

[22] Filed: Jun. 8, 1984

[51] Int. Cl.⁴ .............................................. F16K 31/06
[52] U.S. Cl. .................. 251/129.20; 251/84; 251/129.22
[58] Field of Search ................. 251/138, 140, 141, 84, 251/86, 118, 125; 335/128

[56] References Cited

U.S. PATENT DOCUMENTS

| | | | |
|---|---|---|---|
| 960,757 | 6/1910 | Wilson | 251/138 |
| 1,185,369 | 5/1916 | Cook | 335/128 |
| 1,274,924 | 8/1918 | Michaels et al. | 251/118 |
| 2,241,838 | 5/1941 | Wilson | 335/128 |
| 2,449,086 | 9/1948 | Price | 335/128 |
| 2,892,053 | 6/1959 | Lambert et al. | 335/128 |
| 3,308,407 | 3/1967 | Lake | 335/128 |
| 4,397,443 | 8/1983 | Watanabe et al. | 251/138 |
| 4,446,889 | 5/1984 | Sakakibara et al. | 251/138 |

FOREIGN PATENT DOCUMENTS 64757  6/1955  France ................. 251/141

OTHER PUBLICATIONS

Product News, Bulletin C-64, Essex Wire Co., 10/24/66.

Primary Examiner—Samuel Scott
Assistant Examiner—Noah Kamen
Attorney, Agent, or Firm—Harness, Dickey & Pierce

[57] ABSTRACT

A computer controlled turbo boost valve for internal combustion engines of the type having a turbo charger and a turbo charger feedback line, the valve having a valve element actuated by an internally mounted solenoid which is adapted to be connected to the computer, the valve having a valve element that is operable to regulate bypass flow of exhaust gases from the feedback line and that is mounted so as to be rapidly responsive to energization and deenergization of the solenoid and to be minimally affected by flow of exhaust gases into and through the valve, the components of the valve being uniquely combined and correlated, and the actuator for the valve element in particular being uniquely formed to provide for a high degree of quality control under mass production conditions of manufacture.

14 Claims, 8 Drawing Figures

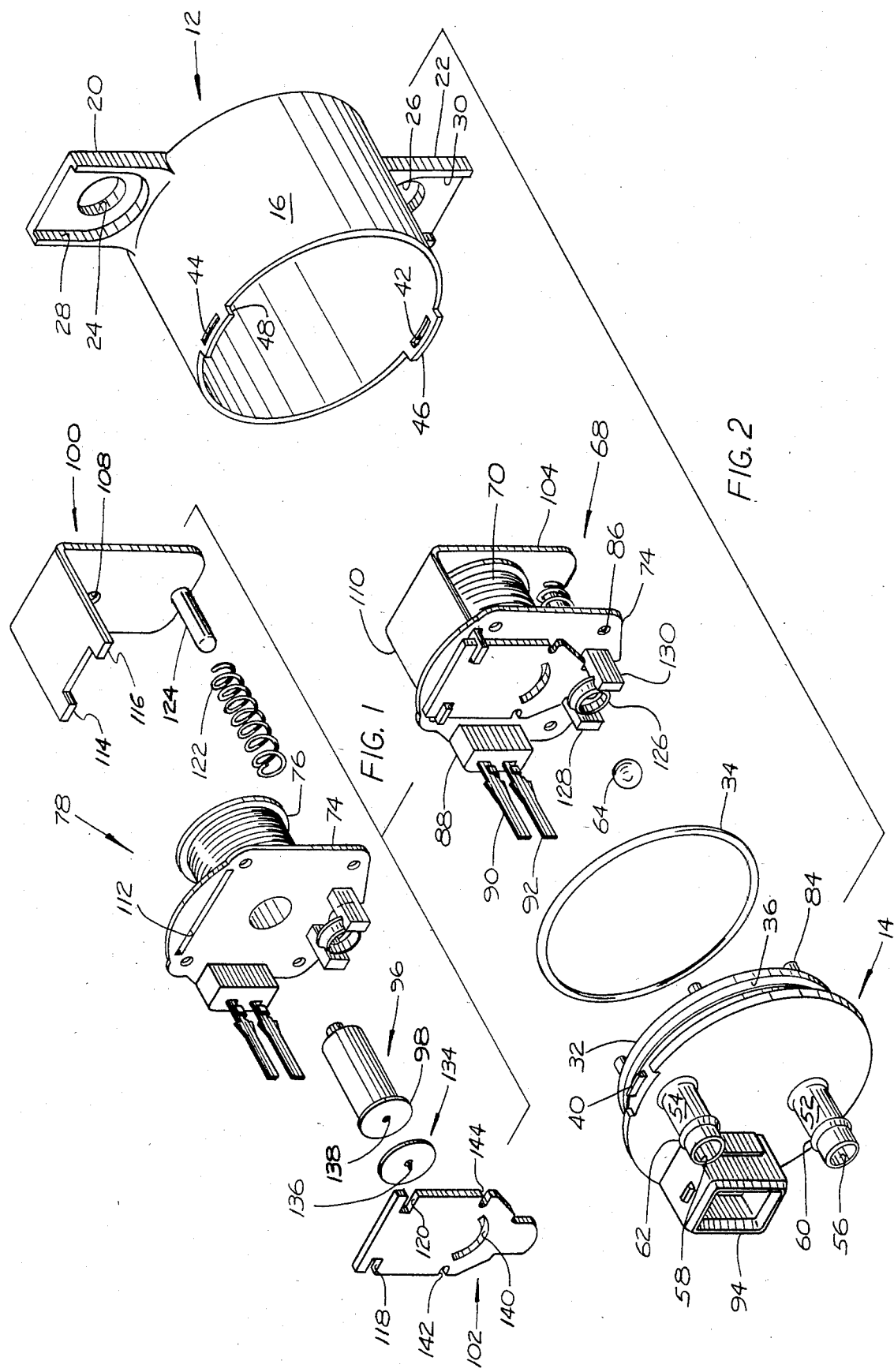

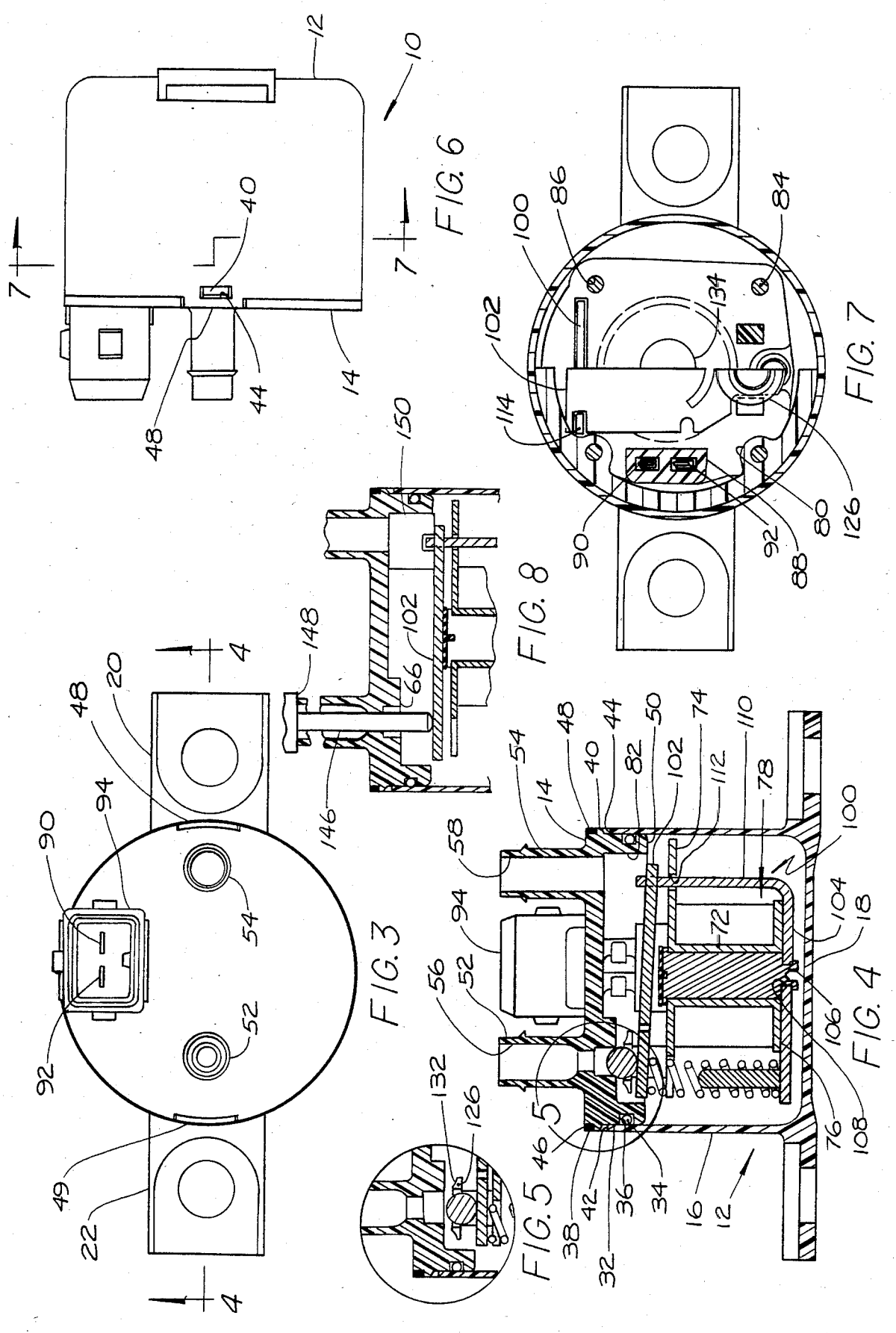

4,561,631

TURBO BOOST VALVE

BACKGROUND OF THE INVENTION

Certain kinds of automotive internal combustion engines have turbo chargers driven by engine exhaust gases that boost air pressure and flow in the intake manifold. The amount of boost is controlled by diverting the boost pressure through a computer controlled turbo boost valve which controls the diverter and directs the engine's exhaust gases either to atmosphere or to the turbo charger. Heretofore, turbo boost valves of the type involved here have required the use of an additional module to control a low resistance solenoid that is expensive, that is manufactured independently, and that must be mounted separately at some convenient location near the valve. This arrangement is inconvenient, awkward and expensive. Furthermore, because of its large size, the relay sometimes is difficult to fit into the space available for it; and this problem is particularly true in the case of relatively small vehicles where assembly and mounting space usually is at a premium.

SUMMARY OF THE INVENTION

The present invention combines the turbo boost valve and the solenoid in a single lightweight, compact, unitary assembly that requires a minimum of space for mounting. The components of the assembly are uniquely combined and correlated to facilitate assembly; and, by eliminating the need to use a solenoid that is separate from the valve assembly, is significantly reduced in cost and the amount of space required for installation is minimized. Also, the unique manner in which the parts are combined and correlated permits the use of a relatively high resistance coil for the solenoid and the latter to be operated directly by the computer signal. The solenoid armature that actuates the turbo valve is uniquely mounted to respond quickly to energization and deenergization of the solenoid coil; and the valve element itself is provided with a novel air deflector that prevents exhaust gases entering and traversing the valve casing from significantly adversely affecting the opening and closing movement and operation of the valve element under the direction of the computer.

DESCRIPTION OF THE DRAWINGS

FIG. 1 is an exploded perspective view showing the inner componentry of the combined turbo boost valve and solenoid of this invention;

FIG. 2 is an exploded perspective view showing the componentry of FIG. 1 assembled and in exploded association with the casing in which it is mounted in use;

FIG. 3 is a front end elevational view of the assembled unitary turbo boost valve and solenoid of this invention;

FIG. 4 is a longitudinal sectional view taken on the line 4—4 of FIG. 3 showing the valve element in closed position;

FIG. 5 is a fragmentary view of the portion of FIG. 4 enclosed in the circle 5 but showing the valve element in open position;

FIG. 6 is a side elevational view of the unitary turbo boost valve and solenoid;

FIG. 7 is a transverse sectional view taken on the line 7—7 of FIG. 6; and

FIG. 8 is a fragmentary cross-sectional view similar to FIG. 4 illustrating the manner in which the armature is checked and formed as required at final assembly of the turbo boost valve.

DESCRIPTION OF THE PREFERRED EMBODIMENT

In the drawing, wherein for the purpose of illustration is shown a preferred embodiment of the invention, the numeral 10 designates the valve casing which is here shown as comprising two normally detachably interconnected cover and base parts 12 and 14, respectively.

The cover 12 constitutes the main body of the casing 10; and it has a tubular side wall 16 having a closed end 18. Radially outwardly extending mounting lugs 20 and 22 are provided at diametrically opposite sides of the cover part 12 and generally flush with the closed end 18. Openings 24 and 26 in respective mounting lugs 20 and 22 are provided for acceptance of screws or the like (not shown) used to mount the casing 10 on the fire wall of the engine or other suitable location. In the particular form of the invention here shown by way of illustration, the front faces of the mounting lugs 20 and 22 are recessed, as shown at 28 and 30, to accommodate the heads of the mounting screws.

As suggested, the base 14 is adapted to interfit with and to close the open end of the cover. As perhaps best shown in FIG. 2, the base 14 is generally disk-shaped and, as shown in FIG. 4, the peripheral wall 32 thereof fits snugly within the open end of the cover 12. An O-ring 34 disposed in an annular groove 36 formed in the periphery 32 seals the joint between the cover 12 and the base 14; and detents 38 and 40 extending laterally outwardly from the base at diametrically opposite sides thereof are adapted to snap into slots 42 and 44 provided in lugs 46 and 48 that extend longitudinally from the cover wall 16 at diametrically opposite sides of the latter. As perhaps best shown in FIG. 4, the sides of the detents 38 and 40 facing the inner end 50 of the base 14 are beveled to spread the lugs 46 when the cover and base are assembled whereby the detents snap readily into the slots 42 and 44 to securely unite the two parts of the casing 10. The opposite sides of the detents 38 and 40 extend radially from the base 14 so as to hold the latter and the cover 12 securely together when assembled. In this connection, however, it will be readily apparent that the cover 12 and the base 14 also can be easily disassembled by flexing the lugs 46 and 48 outwardly by means of a suitable tool to release the detents 38 and 40 from the slots 42 and 44. Formed integrally on the outer face of the base 14 are two longitudinally extending, diametrically opposed, tubular hose connectors 52 and 54. The hose connector 52, shown at the bottom of the base 14 in FIG. 2, is adapted to fit snugly within the terminal end portion of a hose (not shown) which extends from the sensing passage of the turbo charger and conducts engine exhaust gases from the passage to the inlet 56 which extends through the connector 52 and into the casing 10. Similarly, the hose connector 54 is adapted to fit snugly in one terminal end portion of a hose (not shown) that extends therefrom to atmosphere so that exhaust gases exit from the casing 10 through the outlet 58 in the connector. Both of the hose connectors 52 and 54 here shown are formed with annular external ribs 60 and 62 to assure tight connections between the connectors and the hoses to which they are attached; but it will be readily appreciated that, if necessary or desirable, suitable clamps (not shown) may also be provided around the attached ends of the hoses, according to conventional practice, to further assure an adequate connection between the hoses with the connectors 52 and 54.

The flow of exhaust gases through the casing 10 is controlled by a ball valve 64 that engages an annular seat 66 at the inner end of the inlet passage 56. As shown in FIG. 4, the valve element 64 is larger in diameter than the inlet passage 56 so that is closes the inlet passage when engaged with the seat 66. Conversely, when the valve element 64 is backed away from the valve seat 66, it opens the inlet passage 56 and permits exhaust gases to enter and to flow through the casing 10 to the outlet passage 58 and thence to atmosphere.

Opening and closing of the valve element 64 is effected according to the present invention by a solenoid 68 which, as suggested, is mounted as a sub-assembly within the casing 10, as shown in FIG. 2. More particularly, the solenoid 68 comprises the usual wire winding 70 on the tubular center portion 72 and between the end flanges 74 and 76 of a bobbin 78. While the bobbin 78 may be made of any suitable material, according to conventional practice, it is here shown molded from a suitable plastic resin material. The flange 74 that faces the casing base 14 is substantially larger than the flange 76 at the opposite end of the bobbin and it seats on and is fastened to a plurality of posts 80 (here shown as 4) on the base 14. In the particular form of the invention here shown, both the cover 12 and the base 14 also preferably are molded from a suitable plastic resin material. The inner radial face of the base 14 is formed with a central recess 82 that accommodates the adjacent end of the solenoid 68, and the posts 80 are formed in equispaced relation around the recess 82 as integral parts of the base. In this connection, the relatively large mounting flange 74 of the bobbin 78 is here shown to be generally square in plan configuration; and the mounting posts 80 are disposed to seat the corner portions of the flange 74, as shown in FIG. 7. Any suitable or conventional means may be provided for attaching the mounting flange 74 to the posts 80; but this preferably is accomplished by providing the posts with integral, longitudinally extending studs 84 that extend through holes 86 at the corners of the flange 74. The projecting terminal portion of each stud 84 is then peened over by a conventional orbital riveting operation or the like to securely and permanently attach the bobbin 78 to the base 14. Terminal portions of the wire from the winding 70 extend alongside a mounting block 88 on and extending longitudinally from the flange 74 in the direction of the base 14 and are electrically connected to respective male contacts 90 and 92 embedded in the block. When the solenoid is mounted in the casing 10 in the manner hereinabove described, the mounting block 88 is snugly received within a hollow extension 94 on the front face of the base 14 with the male contacts 90 and 92 projecting beyond the extension to provide an external electrical plug on the base end of the casing 10.

Fitted into the central passage of the bobbin 78 is a pole piece 96; and a radial flange 98 on the forward end of the pole piece overlays and seats against the bobbin flange 74 to position the pole piece longitudinally with respect to the bobbin; and the opposite or rearward end of the pole piece terminates flush with or beyond the outer face of the flange 76.

Mounted on and fixed to the rearward end of the pole piece 96 is an L-shaped bracket 100 that mounts and supports an armature 102 forwardly of the bobbin flange 74. More particularly, the arm 104 of the bracket 100 overlays the rear bobbin flange 76 and is fastened securely to the pole piece 96 by means of a stud 106 that is formed on and integral with the pole piece. As perhaps best shown in FIG. 4, the stud 106 extends through and snugly fits an opening 108 in the bracket arm 104; and the projecting end of the stud is peened over to hold the arm solidly against the bobbin flange 76 and in fixed non-rotative position with respect to the bobbin 78. The other bracket arm 110 extends forwardly in radially outwardly spaced relation with respect to the solenoid winding 70 and through a slot 112 in the bobbin flange 74. Formed integrally on the end of the bracket arm 110 that projects forwardly of the bobbin 78, and at opposite sides thereof, are laterally spaced, forward projections 114 and 116 from which the armature 102 is suspended for free swinging pivotal movement to and from the pole piece 96. In this connection, however, it will be readily appreciated that the armature 102 can be attached in any suitable way to the bracket 100 for the necessary free swinging, pivotal movement. In the particular form of the invention here shown, the armature 102 is formed adjacent the upper end and at opposite sides thereof with inwardly extending recesses 118 and 120 that accept and loosely receive the projections 114 and 116. The portion of the armature 102 between the recesses 118 and 120 normally is seated against the forward end of the bracket arm 110; but it otherwise is unattached to the bracket. Thus, the armature 102 is free to move bodily on the projections 114 and 116; and it is readily engageable with and disengageable from the bracket 100.

As suggested, the turbo boost valve of this invention normally is positioned with the mounting lugs 20 and 22 disposed vertically, as shown in FIG. 2; and, when the casing 10 is thus positioned, the armature 102 hangs downwardly from the supporting arm of the bracket 100 in forwardly spaced relation with respect to the pole piece 96 to a position behind the valve element 64 which seats rearwardly thereagainst, as shown in FIG. 4; and the bracket which is of metallic material provides a flux path between the pole piece and the armature. A helical spring 122 interposed between the bracket arm 104 and the lower end portion of the armature 102, and around a forwardly extending retainer pin 124 on the lower end of the bracket arm 104, urges the armature constantly forwardly to hold the valve element 64 in closed position (FIG. 4) against its seat 66. Also, it will be observed that the spring 122 is spaced relatively farther away from the bracket flange 110 than is the valve element 64 so that, in its normally closed position, the valve element serves as a fulcrum on which the armature rocks under action of the spring 122 to hold the pivoted end of the armature against the end of the bracket arm 110. Also, the outboard arrangement of the spring 122 with respect to the valve element 64 provides a leverage factor that makes the spring more effective and efficient in use. In addition, the outboard arrangement referred to makes it possible for the spring 122 to serve the double function of holding the valve element 64 normally closed and also of holding the pivoted end of the armature 102 normally seated against the end of the bracket arm 110 and thus helps to keep the armature assembled on the supporting bracket 100. A valve retainer and air deflector 126 carried by the forward bobbin flange 74 in front of the armature 102, holds the valve element 64 in proper alignment with the inlet 56 and centrally with respect to its seat 66; but, at the same time, it permits the valve element to move freely relative to and from the seat and between open and closed positions. At final assembly, the valve element 64 is placed in the retainer 126 and the spring 122 is mounted on the pin 124 and retracted to permit the armature 102 to be mounted on the supporting bracket 100. When the spring 122 is released, it acts against the armature to hold the valve element 64 against the seat 66.

As shown in FIG. 2, the valve retainer 126 is disposed between and attached to mounting lugs 128 and 130 on and extending forwardly from the front bobbin flange 74 at opposite sides of and spaced laterally from the lower end portion of the armature 102. The retainer 126 is annular in form; and in use it is spaced radially outwardly from the valve element 64 so as to permit free unrestricted movement of the latter to and from the valve seat 66. Also, it will be observed that the front end face 132 of the retainer 126 is tapered rearwardly toward the periphery thereof so as to present a generally radially outwardly and rearwardly tapered surface to air entering the casing through the inlet 56. As a consequence, the retainer 126 deflects the incoming gases radially outwardly with respect to the inlet 56 and thus prevents air pressure from swirling and eddying behind the valve element and creating a back pressure that might prevent free opening and closing movement of the valve element and perhaps cause the latter to bounce or vibrate back and forth between the valve seat and the armature.

Manifestly, when the solenoid 68 is energized, the armature 102 is pulled back against the forward end of the pole piece 96; and, in order to dampen the noise that would otherwise occur when this happens, a thin disk 134 of rubber or rubber-like material is mounted on the forward end of the pole piece 96 to separate the retainer from the armature 102 and to make the valve relatively quiet in operation. In the particular form of the invention here shown, the damper 134 is formed with a small, centrally disposed, rearwardly extending projection 136 that fits snugly within a central recess 138 in the pole piece 96. Frictional engagement between the projection 136 and the surrounding wall of the recess 138 holds the damper 134 on the end of the pole piece; and this condition, together with the relatively close spacing between the pole piece and the armature 102 when the valve element is closed, prevents the damper from disengaging and falling away from the pole piece.

The arrangement of parts described above makes for easy assembly of the armature 102 on the supporting bracket 100; and furthermore, it not only assures proper positioning of the armature with respect to the bobbin 78 but it also permits free unrestricted swinging movement of the armature with respect to the pole piece 96. As will be hereinafter apparent, the way in which the armature 102 is carried by and suspended from the supporting bracket 100 also permits some deformation or bending of the armature at final assembly to compensate for variations in the relative positions of the solenoid components and related parts of the turbo boost valve associated with the armature as a result of manufacturing tolerances and assembly procedures. Manifestly, the parts referred to are not precision made; and small but significant variations may occur particularly in the position of the armature 102 with respect to the pole piece 96 and the valve element 64. However, it is important in the operation of the valve that the spacing between the armature and the pole piece as well as the spacing between the valve element 64 and its seat 66, when the valve element is in the open or unseated position, be held to relatively close dimensions. This is important with respect to the spacing between the pole piece 96 and the armature 102 in order to assure a necessary quick response of the armature to open the valve element 64 when the solenoid 68 is energized. It is important that the open valve spacing not be too small, since air flow through the inlet 56 may then be too slow and inadequate to affect the desired prompt reduced pressure in the sensing passage of the turbo booster when called for by the computer signal that energizes the solenoid. It is a feature of the present invention that these two critical dimensions can be readily established at final assembly of the turbo booster valve in a novel and effective manner.

Further in connection with the foregoing, the armature 102 is formed intermediate the pole piece 96 and the lower end portion thereof which seats the valve element 64 with a transverse slot 140 and adjacent aligned edge recesses 142 and 144 to establish a line of weakness or easy deformation which extends transversely of the armature and permits the latter to be bent along the line by means of a suitable tool 146 inserted into the casing 10 through the inlet 56 as shown in FIG. 8.

In practice, at final assembly, after the solenoid 68 has been mounted on and attached to the base posts 80 in the manner hereinabove described but before the valve element 64 has been assembled in the retainer 126 and before the spring 122 has been assembled on the pin 124. The armature 102 is assembled on its supporting bracket 100 and a wedge 150 is inserted between the base 14 and the pivoted end of the armature to hold the latter seated solidly against the bracket arm 110. The tool 146 is then inserted through the inlet 56 and pressed firmly against the armature 102 with sufficient force to bend the lower portion thereof if necessary. More particularly, the tool 146 is formed with a radial shoulder 148 that seats against the end of the hose connector 52 in use (FIG. 8); and the dimension between the shoulder and the inner end of the tool is precisely the right dimension to provide the desired clearance between the valve element 64 and its seat 66. If the spacing between the armature 102 and the seat 66 at assembly is equal to or greater than the desired dimension, the tool 146 will be used without effect. However, if this spacing is less than the desired dimension, the tool 146 will bend the lower portion of the armature counterclockwise about the line of weakness established by the slot 140 and the recesses 142 and 144. A larger than required spacing between the valve element 64 and the seat 66 is insignificant insofar as the operation of the turbo boost valve is concerned. If the relationship between the parts at final assembly is such that the dimensioning tool 146 is inserted without affect, the armature 102 will be spaced automatically with respect to the pole piece 96 to assure a proper quick response of the armature and opening of the valve element 64 upon energization of the solenoid 68. On the other hand, if the position of the armature at final assembly is such that the lower end thereof is bent by insertion of the tool 146, the armature 102 will have a slight crook at the line of weakness defined by the slot 140 and the recesses 142 and 144; and the altered shape of the armature will not only assure adequate clearance between the valve and the seat but it will also modify the form of the armature to assure proper spacing between it and the pole piece 96. In either event, after the armature 102 has been checked by insertion of the tool 146, the armature can be readily disengaged from the mounting bracket 100 and removed to permit placement of the valve element 64 in the retainer 126. The spring 122 is then placed on the pin retainer 124 and retracted or collapsed to permit remounting of the armature 102 on the bracket 100. The armature 102 will then hold the valve element 64 in place under the resilient action of the spring 122 and the valve is in condition for final assembly by application of the casing cover 12 to the base portion 14. It will be readily apparent that the final adjustments at assembly can be made easily and quickly; and, if desirable, these operations can be fully or at least partially automated.

While it will be apparent that the invention herein described is well calculated to achieve the benefits and advantages as hereinabove set forth, it will be appreciated that the invention is susceptible to modification, variation and change without departing from the spirit thereof.

We claim:

1. A solenoid valve having
   a casing formed in at least two parts one of which has a fluid passage including an inlet and an outlet one of which is formed at the inner end thereof with a valve seat;
   a solenoid in said casing including a bobbin fixedly connected at one end to the part of said casing having said fluid passage, an energizable activating coil on said bobbin, a pole piece in said bobbin, and an armature at one end of said coil and said pole piece;
   means providing a continuous flux flow path for electromagnetic current generated by said coil when energized including a stationary support connected to said pole piece and having a part thereof disposed a substantial distance laterally of said fluid passage, said pole piece being disposed intermediate of and spaced substantial distances laterally of both said valve seat and said support, and said armature being supported by pivot means on the mentioned part of said support and extending laterally therefrom between and transversely of said pole piece and said valve seat;
   a valve element interposed between said valve seat and said armature actuable by the latter from and to said valve seat between closed and open positions to control flow of fluid through said passage;
   spring means coactive with said armature urging the latter away from said pole piece and normally holding said valve element on said valve seat; and
   adjustment means for establishing at assembly of the solenoid valve, simultaneously by a single forming operation, a predetermined spacing between said armature and said pole piece and a predetermined minimum spacing between the valve element and said valve seat when said valve element is in the fully open position, said adjustment means including a line of localized weakness in said armature intermediate said valve seat and said pole piece and laterally away from and out of said continuous flux flow path, whereby said forming operation can be performed by exerting deforming pressure against said armature opposite said valve seat using a tool of precisely predetermined length inserted into said fluid passage through said valve seat while holding said armature firmly against said support at said pivot means.

2. A solenoid valve as defined by claim 1 wherein said one part of the casing has an end wall, at least part of said fluid passage is in said end wall, and said pole piece is disposed substantially centrally of said casing with one end thereof facing and spaced from said end wall.

3. A solenoid valve as defined by claim 2 wherein the pivot connection between said armature and the mentioned part of said support comprises a lay-on seat on said support facing said end wall, and interfitting means of said support and said armature permitting latter to be readily placed on or lifted from said seat for easy assembly of said solenoid valve.

4. A solenoid valve as defined by claim 3 wherein said armature is adapted to be held firmly on and against the lay-out seat portion of said support during said forming operation.

5. A solenoid valve as defined by claim 3 wherein said spring means is coactive with said armature outboard of the point of engagement thereof with said valve element and is operative in use to hold the latter normally in engagement with said lay-on valve seat and simultaneously to rock said armature on said valve element to hold the pivoted end of said armature normally on said seat.

6. A solenoid valve as defined by claim 1 including spring retainer means detachably associated with said spring means for holding the latter in engagement with said armature.

7. A solenoid valve as defined by claim 6 wherein said spring means is in the form of a helical compression spring and said spring retainer means comprises a post mounted on and carried by a second part of said support, said post extending into and loosely fitting said spring means.

8. A solenoid valve as defined by claim 1 wherein said support comprises an L-shaped bracket one arm of which is fixed to said pole piece at the end thereof remote from said armature and the other arm of which extends alongside and is spaced laterally from said coil and forms not only a part of said flux flow but also at least part of the pivot means interconnecting said support and said armature.

9. A solenoid valve as defined by claim 1 wherein said line of localized weakness comprises a slot in and extending transversely of said armature intermediate said valve seat and said pole piece.

10. A solenoid valve as defined by claim 9 wherein said slot is of curved configuration and said line of localized weakness includes notches in the edges of said armature opposite the ends of said slot.

11. A solenoid valve as defined by claim 1 wherein said valve element is in the form of a ball valve, and
    including an annular deflector interposed between and spaced from said valve seat and said armature, said deflector surrounding and being spaced radially from said ball valve and the latter being free-floating in said deflector, said deflector having an annular deflecting surface facing said inlet and tapering radially outwardly and axially away therefrom, whereby said deflector serves the dual function in use of guiding said valve element in its opening and closing movements and of deflected incoming fluid from said inlet radially outwardly from said ball valve to prevent build-up of pressure behind said valve.

12. A computer controlled turbo boost valve for an internal combustion engine having a turbo charger and a turbo charger feed-back line, said valve being of the type having a casing formed in at least two parts and wherein one of said parts has an inlet and an outlet therein, said inlet adapted to be connected to said feedback line and provided at the inner end thereof with a valve seat, a solenoid in said casing having a terminal externally of said casing adapted to be electrically connected to said computer and to be energized thereby, said solenoid including a bobbin attached to and fixedly spaced from said one part of said casing, a pole piece in said bobbin, an armature interposed between, extending transversely of, and spaced from said pole piece and said valve seat, and mounting means of magnetic material fixedly connected to said pole piece at one end of the latter, said mounting means having a pivot connection with said armature permitting swinging movement of the latter to and from said pole piece and said valve seat defining a solid seat for the armature at the pole piece side thereof, a valve element adapted to be interposed between said armature and said valve seat, said valve element being engageable by said armature and engageable with said valve seat to control flow of fluid into said casing through said inlet, the improvement comprising means integral with said armature defining a line of localized weakness extending transversely of said armature intermediate said pole piece and the point of engagement of said valve element by said armature, said means permitting both the spacing between said valve seat and said valve element in the open position of the latter and the spacing between said armature and said pole piece to be precisely established during manufacture of said valve by permanently deforming the armature along said line of weakness by exerting deforming pressure against said armature at a point opposite said valve seat using a tool of precisely predetermined length inserted through said inlet while holding said armature firmly against solid seat at said pivot connection;

and an air deflector disposed adjacent to said valve element and in the path of the engine exhaust entering said casing through said inlet for preventing excessive back pressure behind said valve element, said valve element being in the form of a ball, and said air deflector being annular in form and disposed in surrounding relation to and spaced radially outwardly from said ball valve element, said inlet and said outlet being in one end of said casing, said bobbin having an end flange fixed to said casing and spaced from said one end and from said inlet and said outlet, said annular air deflector being mounted on and supported by said end flange and in coaxial relation with respect to said inlet, and said annular air deflector being disposed between said end flange and an adjacent end of said casing and axially with respect to said inlet, said air deflector being provided with an annular deflecting surface facing in the direction of said inlet and tapering radially outwardly and axially away from said inlet.

13. A turbo boost valve as defined by claim 12, wherein the internal diameter of said air deflector is larger than the diameter of said ball valve, whereby said air deflector serves the dual function of guiding said valve element in its opening and closing movements and of deflecting incoming air from said inlet radially outwardly from said valve element, whereby to prevent build-up of pressure behind said valve element sufficient to interfere significantly with full opening movement of said valve element in use.

14. In a computer controlled turbo boost valve for an internal combustion engine having a turbo charger and a turbo charger feed-back line, a casing having a fluid passage provided with an inlet and an outlet, said inlet adapted to be connected to said feed-back line and being formed at the inner end thereof with a valve seat, the improvement wherein said casing is formed in at least two parts one of which contains said inlet, and including a solenoid in said casing having a terminal externally of the casing adapted to be electrically connected to said computer and be energized thereby, said solenoid including a bobbin fixedly connected at one end to the part of said casing having said inlet, an energizable activating coil on said bobbin, a pole piece in said bobbin, and an armature at one end of said coil and said pole piece;

means providing a continuous flux flow path for electromagnetic current generated by said coil when energized including a stationary support connected to said pole piece and having a part thereof disposed a substantial distance laterally of said inlet, said pole piece being disposed intermediate of and spaced substantial distances laterally of both said inlet and said support, and said armature being supported by pivot means on the mentioned part of said support and extending laterally therefrom between and transversely of said pole piece and said valve seat;

a valve element interposed between said valve seat and said armature actuable by the latter from and to said valve seat between closed and open positions to control flow of fluid through said passage;

spring means coactive with said armature urging the latter away from said pole piece and normally holding said valve element on said valve seat; and adjustment means for establishing at assembly of the solenoid valve, simultaneously by a single forming operation, a predetermined spacing between said armature and said pole piece and a predetermined minimum spacing between the valve element and said valve seat when said valve element is in the fully open position, said adjustment means including a line of localized weakness in said armature intermediate said valve seat and said pole piece and laterally away from and out of said continuous flux flow path, whereby said forming operation can be performed by exerting deforming pressure against said armature opposite said valve seat using a tool of precisely predetermined length inserted through said inlet while holding said armature firmly against said support at said pivot means.

* * * * *